Patented May 13, 1952

2,596,323

UNITED STATES PATENT OFFICE 2,596,323

ASPHALTIC COATING COMPOSITIONS FOR FLOORING, ETC.

Annis G. Asaff, Auburndale, Mass., assignor to Commonwealth Research Laboratories, Boston, Mass., a partnership No Drawing. Application June 11, 1948, Serial No. 32,543

5 Claims. (Cl. 106—277)

This invention relates to new and improved coating compositions for covering floors, walls and the like. The least expensive floor coverings today are surface coatings applied like paint with a brush. Usually two coats are applied and the covering is so thin that it wears through rapidly when subjected to any considerable traffic. Other floor coverings, such as linoleum and tiling are available as thin as one-eighth inch but there is little or no floor covering material available in thicknesses between the very thin brushable coatings and the one-eighth inch coverings. The primary object of my invention comprises the production of a new and improved coating composition that can be applied by trowel to floors, walls and the like in varying thicknesses within these limits and form a covering having desirable characteristics as hereinafter described.

While paints may be thickened with fillers or other means there is no satisfactory way of applying them in considerable thicknesses, due to the sticky nature of the material. Also, they will not dry readily unless filled to a point where adhesion and cohesion becomes lost. Asphalt and other film forming materials may be emulsified to remove the stickiness and then thickened with fillers and applied to desired thickness by brush or trowel. However, emulsions are not waterproof and consequently can neither be used out of doors nor where moisture is a problem. Furthermore, emulsions freeze and their shipping and storage therefore present many problems. Also, the process of emulsification limits emulsions to asphalts and the like of lower melting point.

In order to obviate the above limits and provide other advantages, asphalt cut-backs or hot melts have been employed. Both of these methods permit the use of higher melting point asphalts and result in waterproof installations. However, cut-backs are similar to paints in that only thin layers may be applied because of the problem of drying. Furthermore, since cut-backs cannot be troweled to give a smooth surface the viscosity must be so adjusted as to permit brushing, thereby necessarily resulting in substantially reduced solids contents. Also, since cut-backs are of a liquid consistency like paints, great difficulty is experienced in applying appreciable thicknesses on vertical surfaces because of sagging.

In the case of hot melts, the asphalt must be applied in thicknesses of at least one inch because of the problem of cooling. If thicknesses less than one inch are applied the coating solidifies too rapidly for easy and smooth application. Furthermore, the danger and difficulty of handling hot melts poses many problems, especially from the standpoints of the workmen and the operations involved.

I have discovered that the combining of asphalt or certain other adaptable film forming materials, with a suitable solvent forms a vehicle adapted to receive and form a mastic with suitable aggregates and, furthermore, that the addition of a predetermined amount of alcohol thereto is effective to render the mastic plastic and cohesive and so change its sticky character to non-adhesive character that it can be spread with a trowel. I have thus employed asphalt, chlorinated rubber and polystyrene as film forming materials and formed coating compositions therefrom that can be applied to desired thickness with trowel, and a further object of the invention consists in the production of such vehicles and coating compositions, all as hereinafter more specifically described.

In describing the invention, asphalt will be considered as one of the preferred film forming materials employed. The purpose of the invention is so to formulate asphalt of any melting point that it can be applied very easily in appreciable thicknesses on horizontal or vertical surfaces without any of the difficulties attendant to the use of emulsions, cut-backs or hot melts. I accomplish this object by providing suitable solvents for the asphalt, or other film forming material employed, including total active solvents in the class of aromatic hydrocarbons and less active solvents in the class of oxygenated hydrocarbons, including the acetate esters and ketones, the latter serving to decrease the solvent activity of the former and thereby produce a vehicle capable of responding to the action of the alcohol in removing stickiness, and to receive and form a mastic with suitable aggregates. A further feature of the invention includes the addition of alcohol to the mastic for the purpose of rendering it plastic and cohesive and changing its sticky character to non-adhesive character so that it can be spread with a trowel. The steps embodied in producing the vehicle and mastic will now be specifically described in connection with the several ingredients which I have employed and found most suitable.

The most successful film forming materials which I have found include asphalt, chlorinated rubber and polystyrene. The aromatic hydrocarbons which I have thus far employed include benzol, toluol and xylol. Other hydrocarbons high in aromatic content may also be employed.

The oxygenated hydrocarbons thus far employed include esters of ethyl acetate, isopropyl acetate, butyl acetate and amyl acetate. Other homologs may also be employed and are fully equivalent for purposes of this invention. The alcohols employed include methyl alcohol, ethyl alcohol, propyl alcohol and isopropyl alcohol.

In proceeding with the production of my improved vehicle and mastic I shall first describe the employment of asphalt as the film forming material used. I have proceeded by dissolving 160° F. melting point asphalt in suitable solvents and have found that xylol is the most suitable of the aromatic hydrocarbon solvents and that butyl acetate is the most suitable of the acetate esters. The butyl acetate is a slower acting solvent and I have found that a solvent including xylol and butyl acetate and comprising 50% to 75% butyl acetate is most suitable for forming the desired vehicle of my invention. In forming my improved vehicle I have proceeded by dissolving equal parts by weight of asphalt in the xylol-butyl acetate solution. One preferred vehicle which I have thus far developed is indicated as follows:

70 cc. butyl acetate
30 cc. xylol
100 grams 160° asphalt

Having produced a vehicle of the above described nature I have next proceeded to form a mastic by mixing the vehicle with suitable aggregates. The aggregates which I have thus far employed have included sand, mica and asbestos. One mastic which I have prepared for flooring includes 40 grams of the above described vehicle mixed with the following aggregates:

50 grams beach sand
5 grams #100 mica
3 grams asbestos

Although butyl acetate dissolves asphalt it is somewhat slower in its solvent action and, for solutions of equal solid content, butyl acetate produces appreciably higher viscosity than does xylol. The mastic formed by mixing the vehicle with the aggregate is thick and sticky and difficult to spread, as is all asphalt or any cut-back, and I have discovered that by adding alcohol these characteristics are remarkably changed. The mastic becomes plastic and cohesive and its sticky character is so changed to non-adhesive character that it can be readily spread with a trowel.

In treating the mastic above described I added 10 grams of ethyl alcohol and a two-phase separation thereupon occurred. The mixture apparently absorbed the alcohol initially, but within a few seconds the mix became considerably thicker, a very fluid water-like liquid of a brown color began to separate, and the mastic became a soft, coherent mass which did not adhere to the sides of the glass container. The brown liquid rose to the top of solid phase and upon moving the mass from side to side in the glass container the previously sticky asphaltic mix, which had clung to the glass side-walls like a paint, was pulled off the glass and apparently became incorporated in the moving mass. The walls of the glass container became as clean as they were originally before anything was put into the container, thus indicating a complete lack of adhesion under the conditions existing in the container.

Upon taking out some of this mastic and spreading it with a spatula in a layer of about ⅛ inch thick, very little stickiness was apparent on the knife, and the mastic could be smoothed similarly to a Portland cement, sand, and asphalt emulsion flooring. After about three minutes, the surface of the applied mastic began to get sticky, and upon further drying, a strong, cohesive and adhesive topcoat was obtained.

It has been observed that smoothness of the flooring after drying depends to a very large extent upon the sand content and furthermore that the top surface is not substantially affected by the mica. I thereupon produced a very satisfactory flooring composition having the following ingredients:

60 grams fine beach sand
5 grams asbestos
30 grams vehicle
5 grams alcohol

This composition, in which the alcohol amounts to 31.2% by weight on the asphalt, is found very satisfactory from the standpoints of application and the properties of the final product after drying. Should the composition thus produced be found too soft for heavy duty flooring the same can be readily adjusted by the use of a higher melting point asphalt. It is believed however that the employment of the lower melting point asphalt, because of its greater flexibility, is desirable for walls and other applications where use is not too severe.

It is appreciated that flooring of greater hardness can also be secured by adding other ingredients and following is a composition which I have employed for this purpose:

Vehicle:
    70 cc. butyl acetate
    30 cc. xylol
    35 grams 190° asphalt
    15 grams gilsonite Mastic:
    140 grams fine beach sand (20 mesh)
    50 grams vehicle
    7 grams alcohol In this formula the alcohol amounts to 38.0% by weight on the asphalt and gilsonite.

A mastic embodying this composition can be easily and rapidly applied with a trowel to a thickness of 1/16 inch and dried overnight to a degree permitting use of the flooring under moderate conditions employing no unusual heavy point loads. If flooring of a thickness of ⅛ inch to 3/16 inch is desired, 80 additional grams of 20 mesh sand are added to the above mastic formulation. The flooring will continue to harden and reach its maximum hardness within about one week.

A modified composition of this nature which I have found somewhat more economical to produce, has a pleasanter odor while drying and which breaks cleaner with less alcohol, embodies the following ingredients:

50 cc. butyl acetate
20 cc. acetone
30 cc. xylol
35 grams 160° asphalt
15 grams gilsonite I have applied my improved composition to surfaces of concrete, asbestos shingles, steel, glass, wood and masonite. The concrete and asbestos shingle surfaces were previously primed with an ethyl cellulose base primer. The composition spreads readily to the desired thickness on all these surfaces, forms a secure bond therewith and provides resistance to moisture and acids comparable to cut-back asphalt.

It will now be apparent that I have produced a superior mastic composition that can be spread to any desired thickness. I have found that this is accomplished when a vehicle is employed substantially within the limits above described. When the proportions of the vehicle solvents are varied outside these limits the mastic remains sticky and retains characteristics that prevent its application to required thickness with trowel in a satisfactory manner.

I have in like manner produced a very satisfactory coating composition employing chlorinated rubber as the film forming material in the vehicle, the solvent however embodying butyl acetate and xylol in the same proportions as used with asphalt. One vehicle which I have thus employed is indicated as follows:

Vehicle:
    70 cc. butyl acetate
    30 cc. xylol
    30 grams Parlon 125 (chlorinated rubber)
    30 grams Arochlor 5460 (fortifying and extending resin)
    10 grams Arochlor 1254 (plasticizer)

Arochlor 5460 is a commercially available chlorinated polyphenol, and Arochlor 1254 is a chlorinated biphenol.

I have employed this vehicle in the formulation of several coating mastics, three of which are indicated as follows:

Formulation:
  A. 40 grams beach sand
    4 grams #100 mica
    2 grams chrome green
    61 grams vehicle
    16 grams alcohol
  B. 10 grams Cellite 110
    10 grams #100 mica
    4 grams Titanox
    2 grams chrome green
    100 grams vehicle
    20 grams alcohol
  C. 50 grams marble dust
    5 grams #100 mica
    2½ grams Titanox
    70 grams vehicle
    1 gram chrome green
    17 grams alcohol A suitable amount of alcohol is added and the same phenomenon as occurred with asphalt vehicles upon the addition of alcohol will occur in each of the above formulations. The solid phase trowels smoothly and without packing and upon drying adheres strongly to concrete, steel and other surfaces. This material is particularly useful as a protective steel coating, in swimming pools, exterior coatings, and as a covering for cement floors.

Formulation A provides a relatively smooth surface with a fairly high gloss and makes a very attractive floor covering especially since it may be prepared in any color. Formulation B provides a very smooth surface comparable to a highly troweled plaster wall. Formulation C provides a "hammered" finish and it is especially attractive and useful on walls or on materials where hiding joints is a problem. In all cases the composition dries to a hardness adequate for all practical purposes and is moistureproof and acid and alkali resistant.

I have in like manner produced a very satisfactory coating composition employing polystyrene as the film forming material in the vehicle, the solvent however embodying butyl acetate and xylol in the same proportions as previously used. One vehicle which I have thus employed is indicated as follows:

Vehicle:
    70 cc. butyl acetate
    30 cc. xylol
    30 grams polystyrene
    2½ grams tricresyl phosphate (plasticizer)

I have employed this vehicle in the formation of a coating mastic indicated as follows:

Formulation:
    40 grams beach sand
    4 grams #100 mica
    2 grams chrome yellow
    60 grams vehicle
    21 grams alcohol Alcohol is added in like manner to the mastic and results in giving the composition characteristics permitting it to be spread as in the asphalt and chlorinated rubber compositions above described. The resulting product is crystal-clear, indicating a homogeneous adhesive film and has considerable flexibility.

I have also found Vinylite (polyvinyl chloride-acetate copolymer) to be a very desirable film forming material because of its several outstanding characteristics, including its abrasive resistance and resistance to chemical action. It has been found however that a different solvent system is necessary for this plastic and the two solvent combinations indicated in the following two vehicles have been found to function with Vinylite in the manner of the solvents and film forming materials heretofore described. The two vehicles embodying Vinylite which I have developed and found very satisfactory are indicated as follows:

A. 70 parts xylol
    30 parts cyclohexanone
    25 parts Vinylite
    15 parts tricresyl phosphate
B. 70 parts toluol
    30 parts cyclohexanone
    25 parts Vinylite
    15 parts tricresyl phosphate I have compounded each of these vehicles with mastic forming aggregates as follows:

40 grams beach sand
5 grams asbestos
60 grams vehicle
30 grams (⅓ water, ⅔ ethyl alcohol)

The diluted alcohol in both mixes functions to give the two-phase separation previously described so that the solid phase can be easily applied in coatings of the desired thickness without stickiness or adherence to the trowel. The vehicle A however appears to be somewhat superior and is therefore preferred. Coatings of $\tfrac{1}{16}$ inch troweled from mastic made from vehicle A hardens for ordinary practical use over night and are waterproof.

The ketones which may be used as solvents include methyl, ethyl, ketone, methyl isobutyl ketone, isophorone, and other good solvents for a polyvinyl chloride acetate resin.

Subject matter disclosed but not claimed herein forms the subject of my copending applications, Serial No. 184,726, filed September 13, 1950, and Serial No. 191,734, filed October 23, 1950.

Having thus disclosed my invention what I claim as new and desire to secure by Letters Patent is:

1. A liquid vehicle for use in a coating composition comprising asphalt dissolved in a solvent comprising 25 to 50 per cent of a liquid aromatic hydrocarbon selected from the group consisting of benzol, toluol and xylol and 50 to 75 per cent of a lower aliphatic acetate ester, the amount of asphalt being sufficient to render the vehicle adapted to receive and form a sticky, non-trowelable mastic with a major proportion of solid aggregate filler material and the addition of alcohol thereto being effective to cause a two phase separation and render the mastic plastic and cohesive and of such non-sticky character that it can be spread with a trowel.

2. A liquid vehicle for use in a coating composition comprising a solvent comprising 25 to 50 per cent of a liquid aromatic hydrocarbon selected from the group consisting of benzol, toluol and xylol and 50 to 75 per cent of an ester selected from the group consisting of ethyl acetate, propyl acetate, butyl acetate and amyl acetate and containing asphalt dissolved therein in an amount sufficient to impart to the mixture such viscosity and stickiness that a major proportion by weight of a solid aggregate filler material may be incorporated therein to form a mastic which cannot be spread by trowel to give a smooth surface, the addition of alcohol to said mastic being effective, however, to cause a two phase separation and render the mastic plastic and cohesive and of such non sticky character that it can be spread with a trowel.

3. A surface coating mastic comprising a major proportion of granular solids, the vehicle defined in claim 1, and alcohol in an amount sufficient to render the mastic plastic and cohesive and so changed its sticky character to non-adhesive character that it can be spread with a trowel.

4. A surface coating mastic comprising a major proportion of granular solids, a liquid vehicle comprising asphalt dissolved in a solvent comprising 25 to 50 per cent by weight of a liquid aromatic hydrocarbon selected from the group consisting of benzol, toluol and xylol, and 50 to 75 per cent by weight of an ester selected from the group consisting of ethyl acetate, propyl acetate, butyl acetate and amyl acetate, the amount of asphalt being sufficient to impart to the vehicle such viscosity and stickness that a major proportion by weight of solid aggregate filler material may be incorporated therein to form a mastic which cannot be spread by a trowel to give a smooth surface, and alcohol in an amount sufficient to cause a two phase separation, one phase being entirely liquid and the other phase being plastic and cohesive and of such non-sticky character that it can be spread with a trowel.

5. A surface coating mastic comprising a major proportion of granular solids, a liquid vehicle comprising asphalt dissolved in one to two times its weight of a solvent comprising about 30 per cent by weight of xylol and about 70 per cent by weight of butyl acetate, and alcohol in an amount sufficient to cause a two phase separation, one phase being entirely liquid and the other phase being plastic and cohesive and of such non-sticky character that it can be spread with a trowel.

ANNIS G. ASAFF.

REFERENCES CITED

The following references are of record in the file of this patent:

UNITED STATES PATENTS

| Number | Name | Date |
|---|---|---|
| 2,139,242 | Mock | Dec. 6, 1938 |
| 2,346,970 | Jones | Apr. 18, 1944 |